United States Patent
Andou et al.

(10) Patent No.: US 6,866,272 B2
(45) Date of Patent: Mar. 15, 2005

(54) SEALING RESIN-METAL ASSEMBLY

(75) Inventors: Keisuke Andou, Saitama (JP); Masajiro Inoue, Saitama (JP); Daisuke Okonogi, Saitama (JP); Tadashi Nishiyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/352,959

(22) Filed: Jan. 29, 2003

(65) Prior Publication Data

US 2003/0141672 A1 Jul. 31, 2003

(30) Foreign Application Priority Data

Jan. 30, 2002 (JP) ...................................... P.2002-021022

(51) Int. Cl.[7] ............................ F16J 15/02; H01M 2/08
(52) U.S. Cl. ......................... 277/650; 277/628; 429/35
(58) Field of Search ................................. 277/628, 648, 277/650–654; 429/34–39; 425/415; 428/213–216, 334–336, 450

(56) References Cited

U.S. PATENT DOCUMENTS

| | | | | |
|---|---|---|---|---|
| 4,719,065 A | * | 1/1988 | Gibbon | 277/652 |
| 4,956,226 A | * | 9/1990 | Ashizawa et al. | 277/654 |
| 5,004,650 A | * | 4/1991 | Ashizawa et al. | 277/654 |
| 5,264,299 A | * | 11/1993 | Krasij et al. | 429/34 |
| 5,510,191 A | * | 4/1996 | Higashira et al. | 277/654 |
| 5,671,927 A | * | 9/1997 | Schweiger | 277/630 |
| 6,153,326 A | * | 11/2000 | Matsukawa et al. | 429/34 |
| 6,231,053 B1 | * | 5/2001 | Wakamatsu | 277/628 |
| 6,287,669 B1 | * | 9/2001 | George et al. | 277/654 |
| 6,398,224 B1 | * | 6/2002 | Erb et al. | 277/652 |
| 6,596,427 B1 | * | 7/2003 | Wozniczka et al. | 429/35 |
| 6,667,124 B2 | * | 12/2003 | Suenaga et al. | 277/628 |
| 6,716,550 B1 | * | 4/2004 | Kirby | 429/35 |

FOREIGN PATENT DOCUMENTS

| | | | | |
|---|---|---|---|---|
| EP | 320826 A2 | * | 6/1989 | ............ F16J/15/12 |
| JP | 11129396 | | 5/1999 | |

* cited by examiner

Primary Examiner—Daniel P. Stodola
Assistant Examiner—Christopher J. Boswell
(74) Attorney, Agent, or Firm—Arent Fox PLLC

(57) ABSTRACT

A sealing resin-metal assembly includes a sealing resin layer injection molded on at least one side of a sheet metal via an elastic primer layer within a mold die. A portion of the elastic primer layer that is brought into abutment with the mold die is formed thicker than the other portion of the elastic primer layer that is not brought into abutment with the mold die so that a clamping pressure of the mole die is received by the elastic primer layer at the portion formed thicker, when the sealing resin layer is laminated.

7 Claims, 7 Drawing Sheets

APPLICATION THICKNESS 10μm OF ELASTIC
PRIMER LAYER, INJECTION PRESSURE 170ber

SEALING RESIN-METAL ASSEMBLY

BACKGROUND OF THE INVENTION

1. Field of the Invention

The present invention relates to a sealing resin-metal assembly for use as a cushion material, a packing material or a spacer for electric and/or electronic components, and more particularly to a sealing resin-metal assembly preferable for use as a fuel cell separator.

2. Description of the Related Art

In recent years, polymer electrolyte membrane fuel cells have drawn attentions as a power source for electric vehicles. Polymer electrolyte fuel cells (PEFC) can generate power even at ordinary temperatures and therefore are being put in practical use for various applications.

In general, a fuel cell system is a system constructed such that a polymer electrolyte membrane is held between a cathode electrode and an anode electrode with the cathode electrode being disposed on one side of the polymer electrolyte membrane and the anode electrode on the other side thereof. An external load is driven by power generated through a chemical reaction between oxygen in air supplied to the cathode electrode and hydrogen supplied to the anode electrode.

A fuel cell stack 100 as shown in FIG. 10A is provided in the fuel cell system. The fuel cell stack 100 is constituted by a number of single cells each adapted to generate power with a membrane being held therein, which are stacked repeatedly in many stages in a horizontal direction in such a manner that the surfaces of the electrodes are oriented vertically and are then fastened together with bolts.

As shown in FIG. 10B, the single cell is constituted by a polymer electrolyte membrane M, electrode catalyst layers C, C, gas diffusion layers D, D, an air-side separator SA and a hydrogen-side separator SH.

Of these constituent components, the separators SA, SH are used for links (stacking function) between respective single cells which are stacked in a plural number for generation of a required voltage.

In addition, the separators SA, SH are required to have other functions, and they are:

(1) To secure, within the fuel cell stack 100, supply passages for supplying hydrogen and air to the cells;

(2) To secure supply passages for supplying coolant for cooling the fuel cell stack 100; and (3) To collect and take out current (flow of electrons).

To make them happen, since conductivity and corrosion resistance are required for materials for the separators SA, SH, carbon materials which are mixtures of synthetic graphite or graphite and resin are used.

However, using carbon materials as the separators SA, SH deteriorates the productivity and therefore, in recent years metallic materials have been studied with a view to reducing costs.

In addition, as a seal material for use in laminating the separators SA, SH, as shown in FIG. 10B, a rubber seal material (fluorine system, EPDM or the like) RS, which is formed separately from the separators SA, SH, is inserted to be interposed between the air-side separator SA and the hydrogen-side separator SH so as to function as a cushion material, a packing material, a spacer and a gas leakage preventive seal material.

However, with this sealing method, lots of man-hours are required in assembling a fuel cell stack 100 by stacking single cells, and as a result, there have been caused problems that the production costs of fuel cell stacks 100 are increased and that the safety of fuel cell stacks 100 is damaged by virtue of a failure in assembling the rubber seal material RS.

Then, raised as an improved technique to solve these problems is a technique disclosed in JP-A-11-129396. The technique so disclosed relates to a silicone resin-metal composite material in which a sealing resin layer (packing material) and a metallic material are incorporated.

In this metallic separator, a silicone resin layer having a thickness ranging from 0.05 mm to 1.0 mm and a hardness (JIS K 6301—spring hardness test, A type) ranging from 40 to 70 is injection molded on at least one side of a sheet metal.

The metallic separator provides, however, the following problems at the time of injection molding the silicone resin layer:

(1) While burrs and bubbles are not generated depending upon operating conditions at the time of injection molding, the applicable operating conditions are limited. Further, since liquid silicone is used as a raw material for the silicone layer, when shifting from the operating condition, a leakage of liquid silicone from the interior to the exterior of the die cannot successfully be prevented, and liquid silicone that has so leaked expands to the periphery of the die to form burrs thereat; and (2) In order to prevent the occurrence of burrs, the clamping force of the die needs to be increased to eliminate a gap between the die and the sheet metal. However, increasing the clamping force deforms the sheet metal.

SUMMARY OF THE INVENTION

The invention was made with a view to solving the problems, and an object thereof is to provide a sealing resin-metal assembly which can avoid the risk that the sheet metal is deformed even if the clamping force of the die is increased and moreover which can prevent the generation of burrs.

With a view to solving the problems, according to a first aspect of the invention, there is provided a sealing resin-metal assembly in which a sealing resin layer is injection molded on at least one side of a sheet metal via an elastic primer layer within a die, wherein a portion of the elastic primer layer that is brought into abutment with the mold die is formed thicker than the other portion of the elastic primer layer that is not brought into abutment with the mold die so that a clamping pressure of the mold die is received by the elastic primer layer at the portion formed thicker when the sealing resin layer is laminated.

According to the first aspect of the invention, the pressure borne by the portion of the mold die and the elastic primer layer where they abut with each other (force with which the mold die and the elastic primer layer press against each other when the mold die is clamped) can be increased, and therefore, the sealing quality can be increased, whereby there is caused no risk of leakage of the liquid sealing resin, and as a result, the generation of burrs can be prevented.

According to a second aspect of the invention, there is provided a sealing resin-metal assembly as set forth in the first aspect of the invention, wherein the elastic primer layer is applied such that the application area of the elastic primer layer becomes wider by 0.3 to 1.0 mm in length outwardly beyond an outer edge of the area where the sealing resin layer is to be formed.

According to the second aspect of the invention, the surface of the sheet metal to which the sealing resin layer is injection molded can be flattened. As a result, the adhesion of the abutment surface which abuts with the die can be increased.

According to a third aspect of the invention, there is provided a sealing resin-metal assembly as set forth in the second aspect of the invention, wherein the elastic primer layer applied outwardly beyond the outer edge of the area where the sealing resin layer is injection molded has a thickness ranging from 5 μm to 50 μm and a harness (JIS K 6301—spring hardness test, A type) ranging from 40 to 70.

According to the third aspect of the invention, there are obtained the following effects:

(1) Even in case the pressure for clamping the die which abuts with the elastic primer layer is increased when injection molding the sealing resin layer, since the clamping pressure of the die is allowed to be absorbed by the elastic primer layer having the predetermined hardness, there is caused no risk that the sheet metal is deformed; and (2) In addition, since the sealing quality is increased, there can be eliminated a risk of the leakage of the liquid sealing resin which is a raw material for the sealing resin layer, and as a result, the generation of burrs can be prevented.

DETAILED DESCRIPTION OF THE PREFERRED EMBODIMENTS

Referring to FIGS. 1 to 9, a mode for carrying out the invention will be described specifically. Note that the invention will be described as a sealing resin-metal assembly being applied to a separator which constitutes a fuel cell stack.

Firstly, referring to FIGS. 1 and 2, a separator according to a first embodiment of the invention will be described.

Figure 1A:
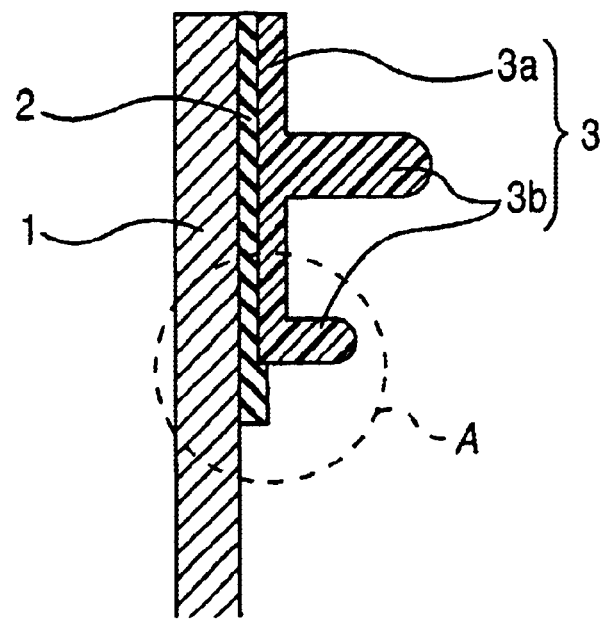
FIG. 1A is a schematic sectional view showing a main part of a separator according to a first embodiment of the invention.
Figure 1B:
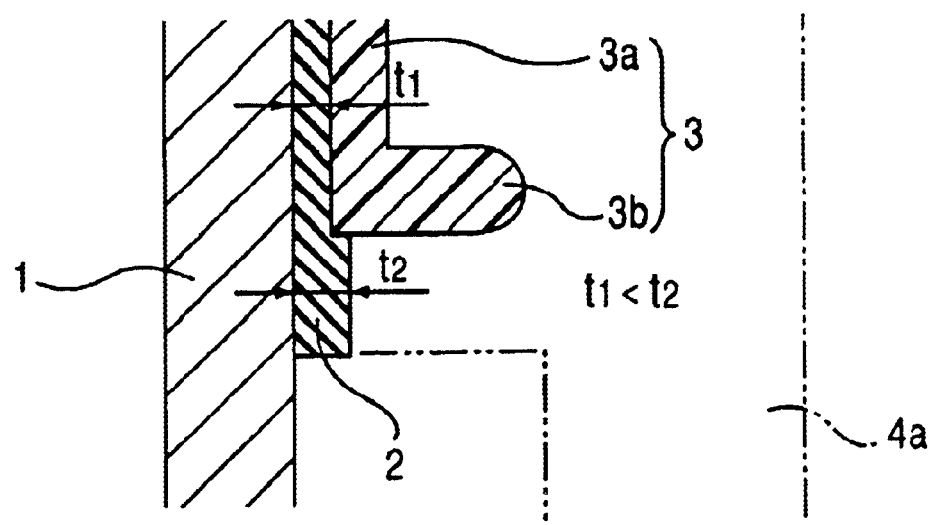
FIG. 1B is an enlarged view of a portion A shown in FIG. 1A.
Figure 2:
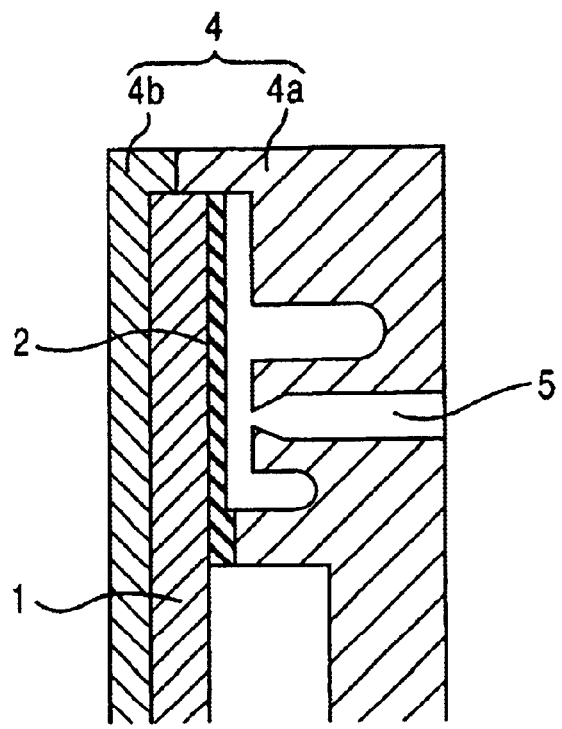
FIG. 2 is a sectional view showing the interior of a die which is used for injection molding a sealing resin layer for the separator shown in FIG. 1A.

Note that FIG. 1A is a schematic sectional view showing a main part of a separator according to a first embodiment of the invention, FIG. 1B is an enlarged view of a portion A shown in FIG. 1A, and FIG. 2 is a sectional view showing the interior of a die used in injection molding a sealing resin layer for the separator.

As shown in FIGS. 1A and 1B, the separator of the first embodiment is a sealing resin-metal assembly including a metallic separator 1, an elastic primer layer 2 and a sealing resin layer 3. The metallic separator 1 is a made of sheet steel, sheet stainless steel, sheet aluminum, plated sheet steel or sheet metal to which an anti-corrosion surface treatment is applied, and forms a reaction gas passage and communication holes, which are both not shown. The elastic primer layer 2 is formed on an upper side of the metallic separator 1 through spraying. The sealing resin layer 3 is further laminated on the elastic primer layer 2 through injection molding. Note that the elastic primer layer 2 may be formed through printing.

When formed, the elastic primer layer 2 is applied such that the application area of the elastic primer layer 2 becomes wider by 0.3 to 1.0 mm in length outwardly beyond an outer edge of the area where the sealing resin layer 3 is to be formed.

As this occurs, in case the length in which the elastic primer layer 2 extends outwardly beyond the outer edge of the sealing resin layer 3 is less than 0.3 mm, the dimension accuracy of length required in expanding the application area of the elastic primer layer 2 is difficult to be controlled, whereas in case the length exceeds 1.0 mm, there may be caused a risk that the area of the metallic separator 1 is enlarged.

Thus, by allowing the elastic primer layer 2 to be applied such that the application area of the elastic primer layer 2 becomes wider by 0.3 to 1.0 mm in length outwardly beyond an outer edge of the area where the sealing resin layer 3 is to be formed, the surface of the metallic separator 1 on which the sealing resin layer 3 is to be formed can be flattened. As a result, the adhesion of the abutment surface which abuts with a die 4 can be increased.

In addition, the die 4 is constituted by a die half 4a and the other die half 4b and in this embodiment, the die half 4a is made to abut with the elastic primer layer 2.

In addition, the portions of the elastic primer layer 2 that are applied outwardly of the outer edge of the area where the sealing resin layer 3 is to be formed by molding, are made to have a thickness ranging from 5 μm to 50 μm and a hardness (JIS K 6301—spring hardness test, A type) ranging from 40 to 70.

This is because in case the thickness of the elastic primer layer 2 at the aforesaid portions is less than 5 μm, irregularities on the surface of the metallic separator 1 cannot be eliminated, whereas in case the thickness exceeds 50 μm, the adhesion between the die half 4a and the elastic primer layer 2 and the accuracy in height of a rib portion 3b cannot be held.

In addition, in case the hardness of the elastic primer layer is less than 40, the elastic primer layer becomes too soft and hence becomes difficult to be handled, whereas in case the hardness exceeds 70, it becomes too hard and hence the elasticity tends to be lost.

Thus, by making the portions of the elastic primer layer 2 that are applied outwardly of the outer edge of the area where the sealing resin layer 3 is to be formed by molding, so as to have the thickness ranging from 5 μm to 50 μm and the hardness (JIS K 6301—spring hardness test, A type) ranging from 40 to 70, (1) Even in case the clamping pressure of the die 4 which abuts with the elastic primer layer 2 when injection molding the sealing resin layer 3 is increased, since the elastic primer layer 2 having the predetermined hardness can absorb the clamping pressure of the die 4, there will be no risk that the metallic separator 1 is deformed.

(2) In addition, since the sealing quality is increased, there is caused no leakage of the liquid sealing resin which is a raw material of the sealing resin layer 3, and as a result, the generation of burrs can be prevented.

Additionally, in this embodiment, as to the thickness of the elastic primer layer 2, as shown in FIG. 1B, the thickness $t_2$ of the elastic primer layer 2 that is brought into abutment with the die half 4a is formed thicker than the thickness $t_1$ of the elastic primer layer 2 that is not brought into abutment with the die half 4a. Namely, the elastic primer layer 2 is used which has a stepped cross section (a dam construction) in which the thickness of the elastic primer layer 2 is thicker at a lower portion than at an upper portion thereof.

Thus, by increasing the thickness $t_2$ of the portions of the elastic primer layer 2 which abut with the die half 4a, at the time of the molding of the sealing resin layer 3, the pressure borne by the surfaces of the die half 4a and the elastic primer layer 2 can be increased while portions of the die half 4a and the elastic primer layer 2 which abut with each other are being collapsed. This allows both the members to adhere to each other, the sealing quality can be increased, whereby there is caused no leakage of liquid sealing resin which becomes a raw material of the sealing resin layer 3 and as a result, the generation of burrs can be prevented.

Note that for example, spray-type metallic primers can be applied to elastic primers that can be used in this embodiment.

With the use of such spray-type metallic primers, primer treatment can be applied to a metal without large-scale facility and lots of man-hours.

In addition, as elastic primers that can be used in the embodiment, for example, a silicone primer No. 101A, B (two-part mixing type) commercially available from Shinetsu Silicone Co., Ltd. or water acryl urethane resin paints can be used.

With the use of silicone primer No. 101A, B (two-part mixing type) commercially available from Shinetsu Silicone Co., Ltd. or water acryl urethane paints, stable rubber-like elasticity can be maintained over a wide range of temperatures.

As a result, even with changes in temperature, the sealing quality between the elastic primer layer 2 and the die half 4a can be held stably.

After an elastic primer layer 2 as has been described above is formed on one side of the metallic separator 1, using the die 4 shown in FIG. 2, a sealing resin layer 3 including a base portion 3a having a height of 0.15 mm to 0.3 mm and a rib portion 3b having a height of 0.5 mm to 2.0 mm is molded through injection molding of liquid sealing resin such as liquid silicone.

As a molding method, a method is used in which a pressurized liquid silicone is injected into a molding die half (a female die half) for a sealing resin layer 3 formed in the mold half 4a from a cold nozzle 5, the periphery of which is cooled by a cooling pipe (not shown), and the molding is then completed for a short period of time (for example, 3 seconds). Since the temperature of the die 4 is set higher than the temperature of the liquid silicone to be injected, the liquid silicone is cured as soon as it is injected into the die.

In case that the height of the base portion 3a of these sealing resin layer 3 is less than 0.15 mm, the thickness cannot be stabilized, whereas in case that the thickness exceeds 0.3 mm, there is caused a risk that a fuel cell stack is enlarged in size.

In addition, in case that the height of the rib portion 3b of the sealing resin layer 3 is less than 0.5 mm, sealing cannot be attained between metallic separators, whereas the height exceeds 2.0 mm, there is caused a risk that a fuel cell stack is enlarged in size.

Note that various types of liquid rubber can be used as liquid silicone being the liquid sealing resin in the embodiment.

Either of single-liquid type RTV rubber or two-part type RTV rubber can be used as liquid rubber. Note that RTV stands for Room Temperature Vulcanizing.

With use of liquid rubber as liquid silicone and use of a molding method in which molding processes are mechanically united, since processes until a molded piece is completed can be automated, the productivity can be increased while labor force can be decreased.

According to the separator of the first embodiment that is constructed and which functions as has been described heretofore;

(1) By increasing the thickness of the elastic primer layer 2 which is brought into abutment with the die 4 to 5 $\mu$m to 50 $\mu$m and allowing the elastic primer layer 2 to be applied such that the application area of the elastic primer layer 2 becomes wider by 0.3 to 1.0 mm in length outwardly beyond the outer edge of the area where the sealing resin layer 3 is to be formed by molding, the surface of the metallic separator 1 can be flattened. Further, even in case the clamping pressure of the die 4 is increased, there is caused no risk that the metallic separator 1 is deformed, thereby making it possible to prevent the generation of burrs.

(2) By covering the surface of the metallic separator 1 with silicone rubber, the sealing resin-metal assembly can be provided which has superior corrosion resistance and electricity insulating quality.

(3) In addition, by making the metallic separator 1 and the sealing resin layer 3 integral with each other, not only can the sealing resin layer 3 be formed into complicated configurations but also the man-hours for fabricating the assembly can be reduced.

Next, referring to FIGS. 3 and 4, a separator according to a second embodiment of the invention will be described.

Figure 3:
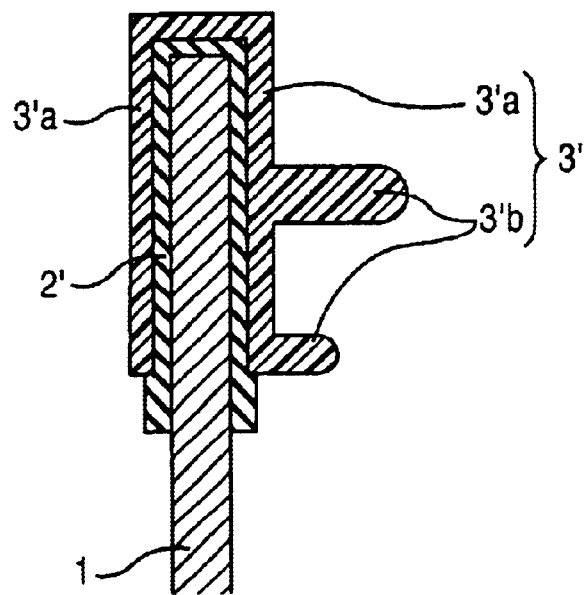
FIG. 3 is a schematic sectional view showing a main part of a separator according to a second embodiment of the invention.
Figure 4:
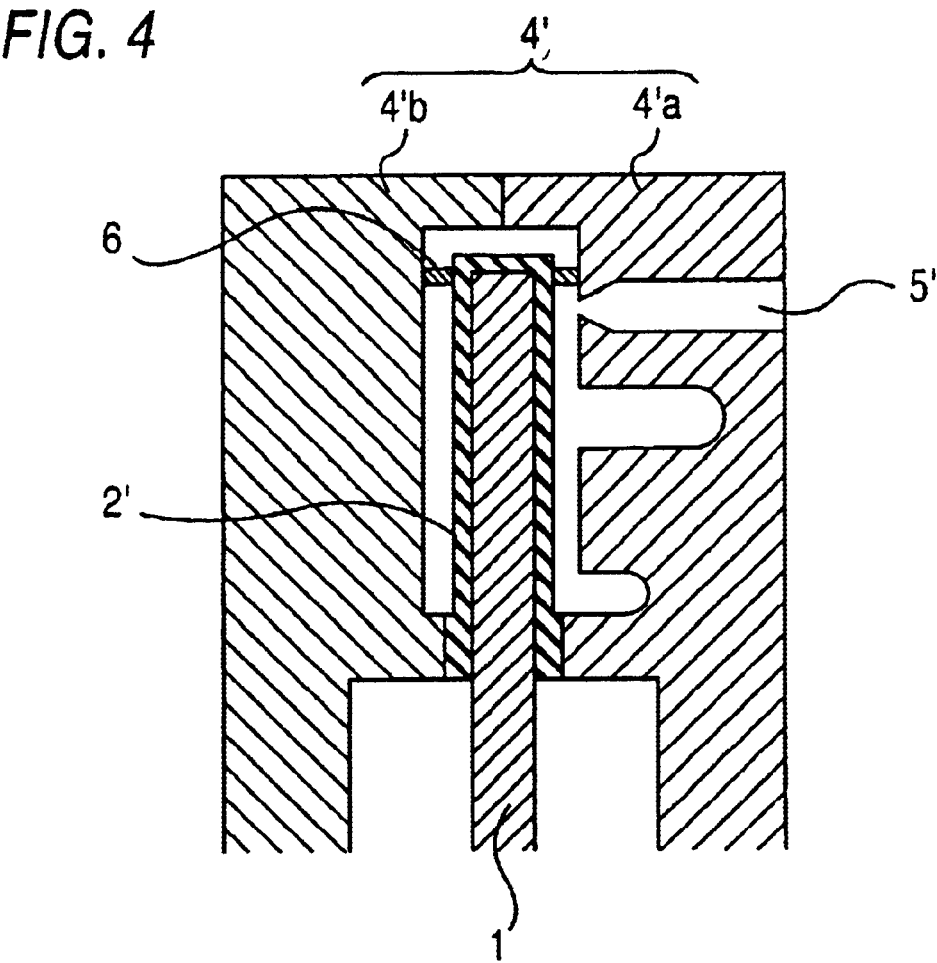
FIG. 4 is a sectional view showing the interior of a die which is used for injection molding a sealing resin layer for the separator shown in FIG. 3.

Note that FIG. 3 is a schematic sectional view showing a main part of a separator of a second embodiment according to the invention, and FIG. 4 is a sectional view showing the interior of a die used for injection molding a sealing resin-metal assembly for the separator shown in FIG. 3.

Note that like reference numerals are imparted to members like to those described with reference to the separator of the first embodiment.

As shown in FIG. 3, the separator of the second embodiment is a sealing resin-metal assembly including a metallic separator 1, an elastic primer layer 2' and a sealing resin layer 3'. The metallic separator 1 is made of a sheet steel, sheet stainless steel, sheet aluminum, plated sheet steel or sheet metal with an anti-corrosion surface treatment, and forms a reaction gas passage and communication holes, which are both not shown. The elastic primer layer 2' is formed on both sides of the metallic separator 1 through spraying in such a manner as to over an upper end portion of the metallic separator 1. The sealing resin layer 3' is further laminated on the elastic primer layer 2' through injection molding. Note that the elastic primer layer 2' may be formed through printing.

When formed, the elastic primer layer 2' is applied such that the application area of the elastic primer layer 2' becomes wider by 0.3 to 1.0 mm in length outwardly beyond an outer edge of the area where the sealing resin layer 3' is to be formed.

As this occurs, in case that the length of the elastic primer layer 2' extending over the outer edge of the sealing resin layer 3' is less than 0.3 mm, the dimension accuracy of length required in expanding the application area of the elastic primer layer 2' is difficult to be controlled, whereas in case the length thereof exceeds 1.0 mm, there maybe caused a risk that the area of the metallic separator 1 is enlarged.

Thus, by allowing the elastic primer layer 2' to be applied such that the application area of the elastic primer layer 2' becomes wider by 0.3 to 1.0 mm in length outwardly beyond the outer edge of the area where the sealing resin layer 3 is to be formed by molding, the surface of the metallic separator 1 on which the sealing resin layer 3' is to be formed can be flattened. As a result, the adhesion of the abutment surface which abuts with a die 4' can be increased.

In addition, the die 4' is constituted by a die half 4a' and the other die half 4b' and in this embodiment, both the die halves 4a', 4b' are made to abut with the elastic primer layer 2'.

In addition, the portions of the elastic primer layer 2' that are applied outwardly of the outer edge of the area where the sealing resin layer 3' is to be formed by molding are made to have a thickness ranging from 5 µm to 50 µm and a hardness (JIS K 6301—spring hardness test, A type) ranging from 40 to 70.

This is because in case that the thickness of the elastic primer layer 2' at the aforesaid portions is less than 5 µm, irregularities on the surface of the metallic separator 1 cannot be eliminated, whereas in case that the thickness exceeds 50 µm, the adhesion between the die 4' and the elastic primer layer 2' and the accuracy in height of a rib portion 3'b cannot be held.

In addition, in case that the hardness is less than 40, the elastic primer layer becomes too soft and hence becomes difficult to be handled, whereas in case that the hardness exceeds 70, it becomes too hard and hence the elasticity tends to be lost.

Thus, by making the portions of the elastic primer layer 2' that are applied outwardly of the outer edge of the area where the sealing resin layer 3' is to be formed, so as to have the thickness ranging from 5 µm to 50 µm and the hardness (JIS K 6301—spring hardness test, A type) ranging from 40 to 70, (1) Even in case the clamping pressure of the die 4' which abuts with the elastic primer layer 2' when molding the sealing resin layer 3' is increased, since the elastic primer layer 2' having the predetermined hardness can absorb the clamping pressure of the die 4', there will be no risk that the metallic separator 1 is deformed.

(2) In addition, since the sealing quality is increased, there is caused no leakage of the liquid sealing resin which is a raw material of the sealing resin layer 3', and as a result, the generation of burrs can be prevented.

Additionally, in this embodiment, as to the thickness of the elastic primer layer 2', as with shown in FIG. 1B, the thickness of the elastic primer layer 2' that is brought into abutment with the die half 4' when molding the sealing resin layer 3' is formed thicker than the thickness of the elastic primer layer 2' that is not brought into abutment with the die half 4'. Namely, the elastic primer layer 2' is used which has a stepped cross section (a dam construction) in which the thickness of the elastic primer layer 2' is thicker at a lower portion than at an upper portion thereof.

Thus, by enlarging the thickness of the portions of the elastic primer layer 2' which abut with the die 4', the pressure borne by the surfaces of the die 4' and the elastic primer layer 2' can be increased, and hence the sealing quality can be increased. Further, there is caused no leakage of liquid sealing resin which becomes a raw material of the sealing resin layer 3' and as a result, the generation of burrs can be prevented.

After an elastic primer layer 2' as has been described above is formed, using the die 4' shown in FIG. 4, a sealing resin layer 3' including a base portion 3a' having a height of 0.15 mm to 0.3 mm and a rib portion 4b' having a height of 0.5 mm to 2.0 mm is molded through injection molding of liquid sealing resin such as liquid silicone.

As a molding method, a method is used in which a pressurized liquid silicone is injected into a molding die (a female die half) for a sealing resin layer 3' formed in the die half 4a' from a cold nozzle 5' the periphery of which is cooled by a cooling pipe (not shown), and the molding is then completed for a short period of time (for example, 3 seconds).

Since the temperature of the die 4' is set higher than the temperature of the liquid silicone injected, the liquid silicone is cured as soon as it is injected into the die.

As this occurs, in case that the height of the base portion 3a' of the sealing resin layer 3' is less than 0.15 mm, the thickness cannot be stabilized, whereas in case that the thickness exceeds 0.3 mm, there is caused a risk that a fuel cell stack is enlarged in size.

In addition, in case that the height of the rib portion 3b' of the sealing resin layer 3' is less than 0.5 mm, sealing cannot be attained between metallic separators, whereas in case that the height exceeds 2.0 mm, there is caused a risk that a fuel cell stack is enlarged in size.

Note that a reference numeral 6 in FIG. 4 denotes a fall-preventive pin provided for preventing the fall of the metallic separator 1, since in case that molding is proceeded with the metallic separator 1 being held in a condition in which it is falling when a sealing resin layer 3' is being molded on the both sides of the metallic separator 1 at the upper portion thereof, the thickness of the sealing resin layer 3' so molded on the sides of the metallic separator 1 becomes irregular.

According to the separator of the second embodiment that is constructed and which functions as has been described heretofore; by increasing the thickness of the elastic primer layer 2' which is brought into abutment with the die 4' to 5 µm to 50 µm and allowing the elastic primer layer 2' to be applied such that the application area of the elastic primer layer 2' becomes wider by 0.3 to 1.0 mm in length outwardly beyond the outer edge of the area where the sealing resin layer 3' is to be formed, the surface of the metallic separator 1 can be flattened, and even in case the clamping pressure of the die is increased, there is caused no risk that the metallic separator 1 is deformed, thereby making it possible to prevent the generation of burrs.

EXAMPLE

The invention will be described in greater detail below by way of an example.

Figure 5:
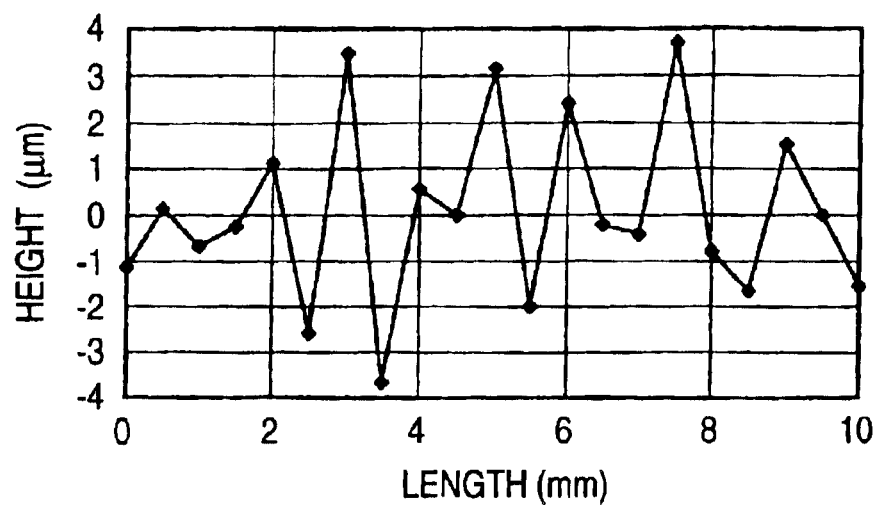
FIG. 5 is a graph showing the surface roughness of a metallic separator to which no surface treatment is applied.
Figure 6:
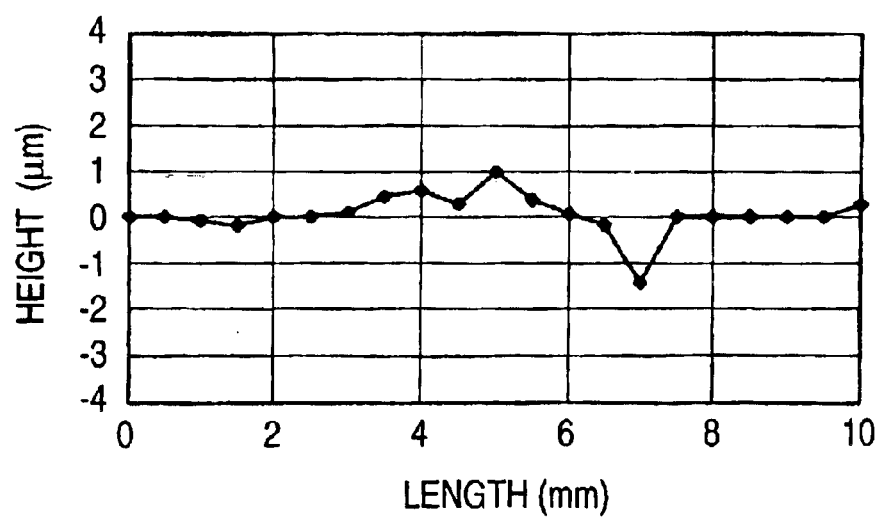
FIG. 6 is a graph showing the surface roughness of the separator to which an elastic primer layer is applied.

A difference in surface roughnesses resulting when the elastic primer layer is actually formed on the metallic surface of the metal separator and when no such layer is formed on the same with reference to FIGS. 5 and 6.

Note that FIG. 5 is a graph showing the surface roughness of a metallic separator to which no surface treatment is applied, whereas FIG. 6 is a graph showing the surface roughness of the metallic separator to which the elastic primer layer has been applied.

As is seen from FIG. 5, the surface roughness of the metallic separator to which no surface treatment is applied varies +/−3.8 μm at its maximum. However, the surface of the metallic separator can preferably be flattened to such an extent that the surface roughness only varies +/−1.5 μm at its maximum, as shown in FIG. 6, when the surface is treated with the elastic primer layer.

Next, a relationship between the application area of the elastic primer layer and the occurrence of burrs and a relationship between the application thickness of the elastic primer layer and the generation of burrs will be described with reference to FIGS. 7 and 8, respectively.

Figure 7:
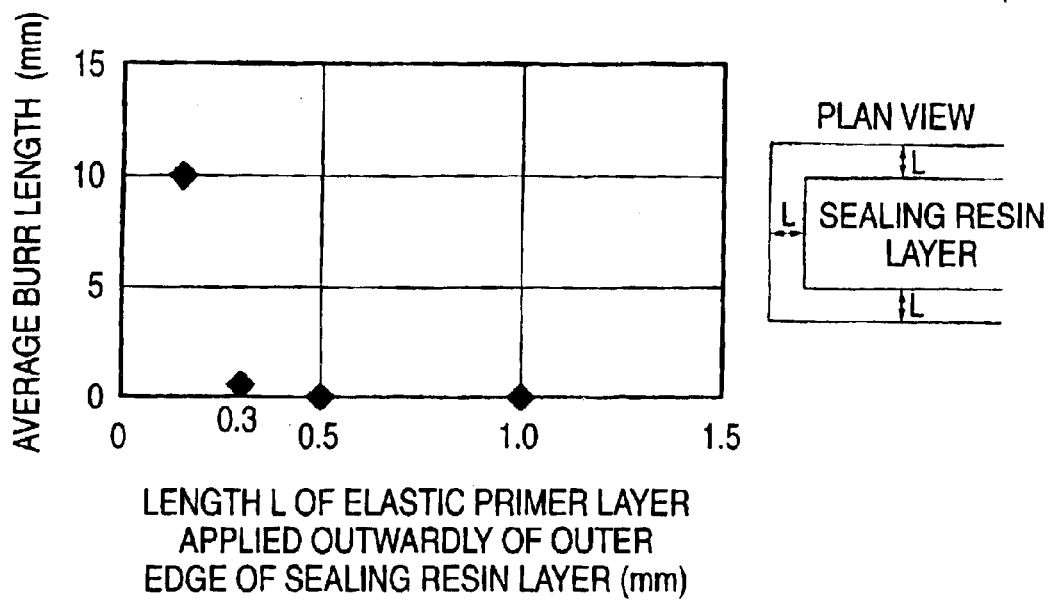
FIG. 7 is a graph showing the relationship between the application area of the elastic primer layer and the generation of burrs.

As is seen from FIG. 7, by allowing the elastic primer layer to be applied such that the application area thereof becomes wider by 0.3 to 1.0 mm in length outwardly beyond the outer edge of the area where the sealing resin layer is to be formed, there can be eliminated the generation of burrs.

Figure 8:
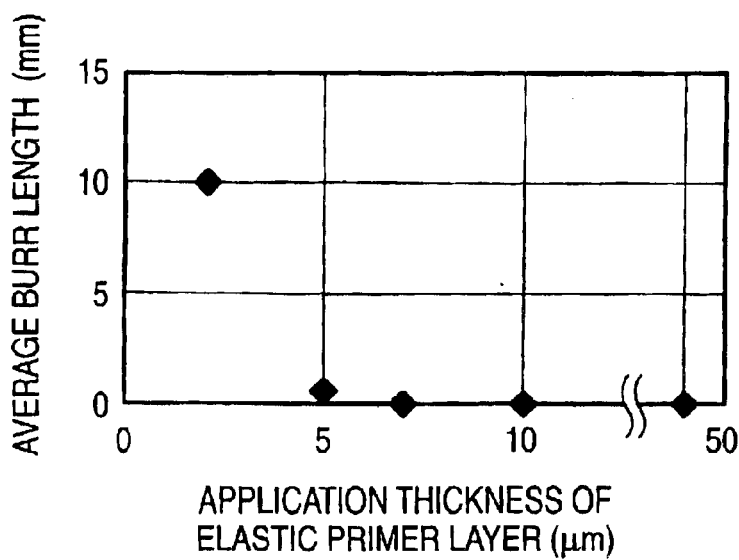
FIG. 8 is a chart showing the relationship between the application thickness of the elastic primer layer and the generation of burrs.

In addition, by allowing the elastic primer layer to be applied to the thickness ranging from 5 μm to 50 μm at the portions thereof which are situated outwardly of the outer edge of the area where the sealing resin layer is to be formed, as is seen from FIG. 8, there can similarly be eliminated the generation of burrs.

Next, the relationship between a force with which the die is clamped or the die clamping force and the generation of burrs will be described with reference to FIG. 9.

Note that the application thickness of the elastic primer layer and the injection pressure used were 10 μm and 170 bar (17 Mpa), respectively.

Figure 9:
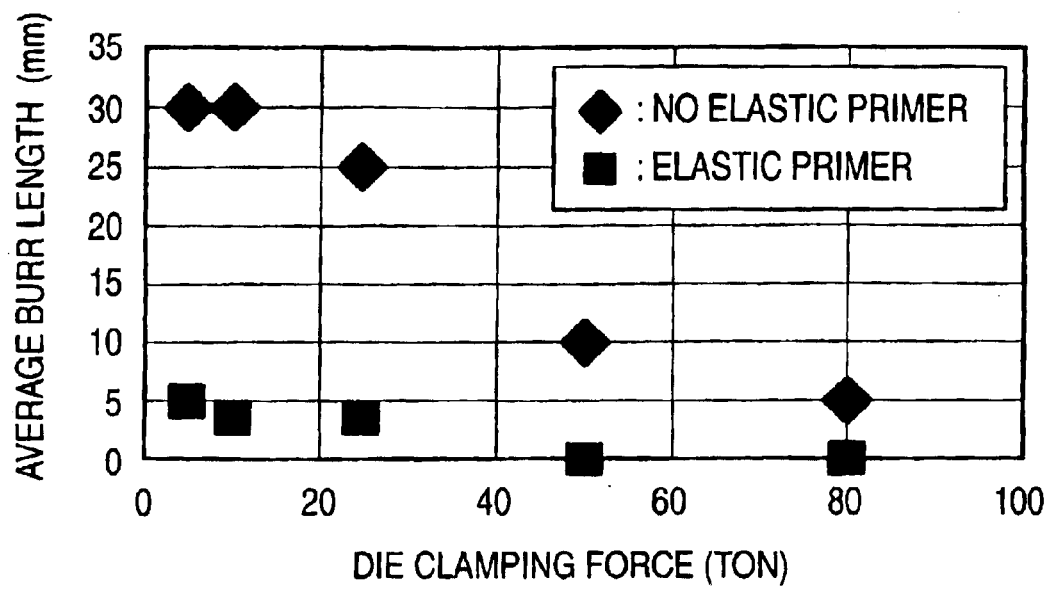
FIG. 9 is a chart showing the relationship between the generation of burrs and the die clamping force.
Figure 10A:
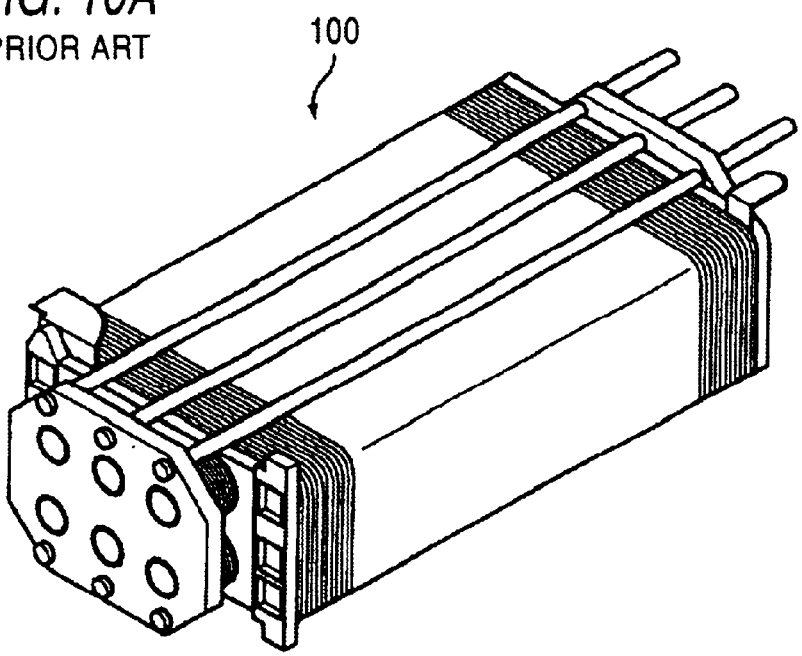
FIG. 10A is a perspective view showing the external view of a conventional fuel cell stack.
Figure 10B:
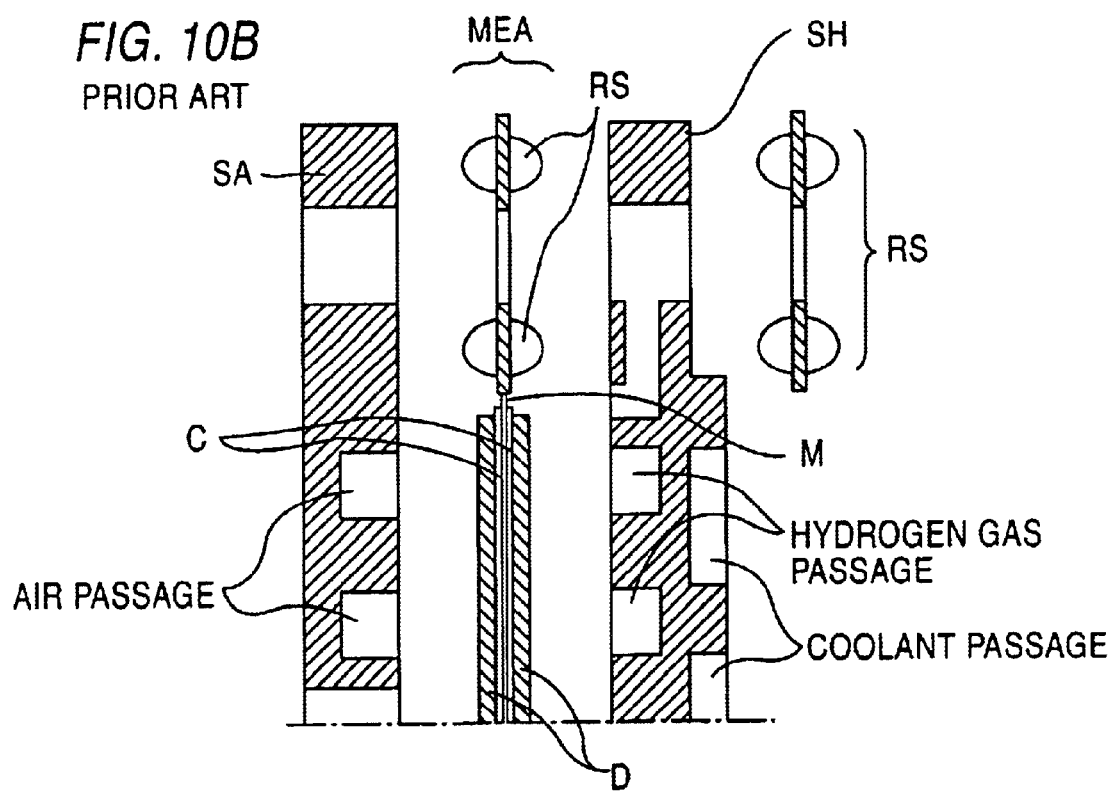
FIG. 10B is an enlarged view of the construction of a single cell of the fuel cell shown in FIG. 10A.

As is seen from FIG. 9, in the event that the elastic primer layer is not applied to the metallic separator, it is inevitable that burrs are generated even with the die clamping force of 80 tons. However, it is seen that given that the elastic primer layer is applied to the metallic separator and 50 tons or more is imparted as the die clamping force, the generation of burrs can be prevented.

Thus, according to the invention, by applying the elastic primer layer 2, 2' on the surface of the metallic separator 1, increasing the thickness of the elastic primer layer 2, 2' to 5 μm to 50 μm, and allowing the elastic primer layer 2, 2' to be applied such that the application area thereof becomes wider by 0.3 to 1.0 mm in length outwardly beyond the outer edge of the sealing resin layer 3, 3' that is to be laminated on the elastic primer layer 2, 2', the surface of the metallic separator 1 can be flattened, and moreover, even if the clamping force for clamping the die 4, 4' is increased, the generation of burrs can be prevented without any risk that the metallic separator 1 is deformed.

Lastly, the invention is not limited to the separator according to the first embodiment and the separator according to the second embodiment but may be modified and embodied variously without departing from the scope of the technical concept of the invention.

For example, the sealing resin-metal assembly can be applied not only to separators constituting a fuel cell stack but also to separators for a pressure filter in which a number of metallic separators each having formed thereon gas and liquid passages are used to be stacked or a water electrolyzer for producing hydrogen and oxygen by electrolyzing water.

In addition, while the metallic separators shown in the figures are illustrated as being a flat plate in the embodiments, the metallic separators can be applied to a metallic separator having a groove or grooves in the surface thereof.

What is claimed is:

1. A sealing resin-metal assembly in which a sealing resin layer is injection molded on at least one side of a sheet metal via an elastic primer layer within a mold die, wherein a portion of said elastic primer layer that is brought into abutment with said mold die is formed thicker than the other portion of said elastic-primer layer that is not brought into abutment with said mold die so that a clamping pressure of said mold die is received by said elastic primer layer at said portion formed thicker, when said sealing resin layer is laminated.

2. The sealing resin-metal assembly according to claim 1, wherein said elastic primer layer is applied such that the application area of said elastic primer layer becomes wider by 0.3 to 1.0 mm in length outwardly beyond an outer edge of an area where said sealing resin layer is to be formed.

3. The sealing resin-metal assembly according to claim 2, wherein said elastic primer layer that is applied outwardly beyond the outer edge of said area where said sealing resin layer is to be formed has a thickness ranging from 5 μm to 50 μm and a hardness—spring hardness ranging from 40 to 70.

4. A sealing resin-metal assembly, comprising:
a sheet metal;
an elastic primer layer disposed on said sheet metal; and
a sealing resin layer formed on at least one side of said sheet metal via said elastic primer layer,
wherein said elastic primer layer has a first area on which said sealing resin layer is formed and a second area free from contacting with said sealing resin layer, and said second area of said elastic primer layer is formed thicker than said first area of said elastic primer layer.

5. The sealing resin-metal assembly according to claim 4, wherein said second area of said elastic primer layer extending outwardly from an outer edge of said first area thereof has a length of 0.3 to 1.0 mm.

6. The sealing resin-metal assembly according to claim 5, wherein said second area of said elastic primer layer has a thickness ranging from 5 μm to 50 μm and a hardness ranging from 40 to 70.

7. The sealing resin-metal assembly according to claim 4, wherein said sealing resin layer including a base portion having a height of 0.15 mm to 0.3 mm and a rib portion extending vertically from said base portion and having a height of 0.5 mm to 2.0 mm.

* * * * *